United States Patent
Patri et al.

(10) Patent No.: US 10,541,759 B2
(45) Date of Patent: Jan. 21, 2020

(54) UNDERGROUND COMMUNICATION SYSTEM

(71) Applicant: Indian Institute of Technology Bombay, Mumbai (IN)

(72) Inventors: Ashutosh Patri, Balasore (IN); Jayanta Mukherjee, Mumbai (IN)

(73) Assignee: INDIAN INSTITUTE OF TECHNOLOGY BOMBAY, Maharashtra (IN)

( * ) Notice: Subject to any disclaimer, the term of this patent is extended or adjusted under 35 U.S.C. 154(b) by 0 days.

(21) Appl. No.: 15/770,350

(22) PCT Filed: Aug. 17, 2016

(86) PCT No.: PCT/IN2016/050274
§ 371 (c)(1),
(2) Date: Apr. 23, 2018

(87) PCT Pub. No.: WO2017/033207
PCT Pub. Date: Mar. 2, 2017

(65) Prior Publication Data
US 2019/0132060 A1     May 2, 2019

(30) Foreign Application Priority Data

Aug. 27, 2015 (IN) .......................... 3292/MUM/2015

(51) Int. Cl.
| | |
|---|---|
| *H04B 13/02* | (2006.01) |
| *H04W 40/22* | (2009.01) |
| *H04W 4/38* | (2018.01) |
| *H01Q 1/04* | (2006.01) |
| *H01Q 1/36* | (2006.01) |

(52) U.S. Cl.
CPC ............... *H04B 13/02* (2013.01); *H01Q 1/04* (2013.01); *H01Q 1/36* (2013.01); *H04W 4/38* (2018.02); *H04W 40/22* (2013.01)

(58) Field of Classification Search
CPC ............ H04B 13/02; H04W 4/38; H01Q 1/04
USPC ............................................ 343/719; 455/40
See application file for complete search history.

(56) References Cited

U.S. PATENT DOCUMENTS

| | | | |
|---|---|---|---|
| 2011/0205033 A1* | 8/2011 | Bandyopadhyay | ..... E21F 17/18 340/10.51 |
| 2011/0316745 A1* | 12/2011 | Yin | ........................ H01Q 1/243 342/372 |

\* cited by examiner

*Primary Examiner* — Ayodeji O Ayotunde (57) ABSTRACT

Embodiments herein provide a system for underground communication. The system includes a surface layer and an underground layer. The surface layer includes an unburied transceiver station connected to a base station. The underground layer includes a buried transceiver station connected to the unburied transceiver station. The underground layer includes an electronic device with a meta-material antenna and a transceiver in communication with the buried transceiver station. Further, the underground layer includes a coordinator in communication with a plurality of sensors nodes and a plurality of routers. The underground layer includes an unburied transceiver station in communication with the plurality of routers and meta-material antenna. The unburied transceiver station in underground layer communicates with the buried transceiver station. The communication is facilitated between the underground layer and base station in the surface layer through either a meta-material antenna or an unburied transceiver station in underground layer, by buried transceiver station.

7 Claims, 9 Drawing Sheets

UNDERGROUND COMMUNICATION SYSTEM

FIELD OF INVENTION

The embodiments herein relate to a communication system and more particularly relates to underground communication system. The present application is a National Phase Application for PCT application No. PCT/IN2016/050274 based on, and claims priority to Indian Application Number 3292/MUM/2015 filed on 27 Aug. 2015, the disclosure of which is hereby incorporated by reference herein

BACKGROUND OF INVENTION

Generally, communication is the activity related to the transmission of signals (data) for information exchange. Underground communication includes transmission of data from a sender to a receiver which may be in groups or from a person to another person in which the transmission deals with the amount and speed of data through transmission system.

Existing system for underground communication includes usage of antennas. These antennas help in locating and tracking the persons in case of disaster for speedy rescue operation. However, these antennas are generally heavy in size and operate under low frequency bands.

The above information is presented as background information only to help the reader to understand the present invention. Applicants have made no determination and make no assertion as to whether any of the above might be applicable as Prior Art with regard to the present application.

SUMMARY

The principal object of the embodiments herein is to provide an underground communication system in one or more levels.

Another object of the embodiments herein is to provide a meta-material antenna in an electronic device for underground communication.

Accordingly the embodiments herein provide a communication system. The communication system includes a surface layer and an underground layer. The surface layer includes an unburied transceiver station connected to a base station. The underground layer includes a buried transceiver station connected to the unburied transceiver station. The underground layer includes an electronic device with a meta-material antenna and a transceiver in communication with the buried transceiver station. Further, the underground layer includes a coordinator in communication with a plurality of sensors nodes and a plurality of routers. The underground layer includes an unburied transceiver station in communication with the plurality of routers and meta-material antenna. The unburied transceiver station communicates with the buried transceiver station. The communication is facilitated between the underground layer and base station in the surface layer through either a meta-material antenna or an unburied transceiver station, by a buried transceiver station.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a system for underground communication. The communication system includes a surface layer and an underground layer.

In an embodiment, the surface layer includes an unburied transceiver station connected to a base station.

In an embodiment, the underground layer includes a buried transceiver station connected to the unburied transceiver station.

The underground layer includes an electronic device with a meta-material antenna and a transceiver in communication with the buried transceiver station.

In an embodiment, the size of the meta-material is small and operates under very high frequency (VHF) band.

Furthermore, the underground layer includes a coordinator in communication with a plurality of sensors nodes and a plurality of routers. The underground layer includes an unburied transceiver station in communication with the plurality of routers and meta-material antenna.

The unburied transceiver station communicates with the buried transceiver station. The communication is facilitated between the underground layer and base station in the surface layer through buried transceiver station with help of meta-material antenna and the unburied transceiver station.

Unlike, the conventional underground communication system, the proposed communication system provides safety for persons during underground mining or persons working underground. In case of mining, the proposed system provides an electronic device with meta-material antenna which is carried by the miner. The size of the meta-material antenna is small and portable when compared to antennas in the conventional system. The miner can communicate data from underground layer to the surface layer through the electronic device with meta-material antenna. Further, the proposed system provides communication through earth using buried transceiver stations and unburied transceiver stations which are capable of communicating data through ground (soil). The proposed system is robust, flexible and can be readily implemented in the underground mines as well as in case of tunnels for data communication.

Referring now to the drawings and more particularly to FIGS. 1 through 4B through where similar reference characters denote corresponding features consistently throughout the figures, there are shown preferred embodiments.

Figure 1:
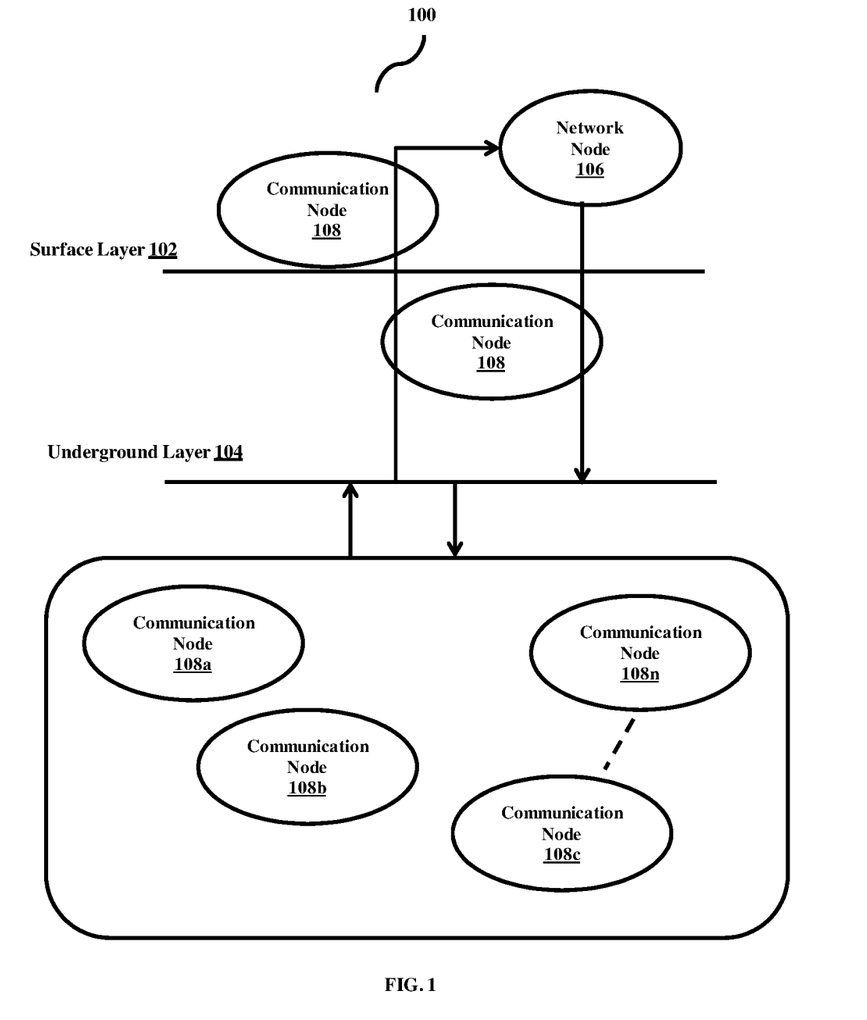
FIG. 1 illustrates a high level overview of a communication system, according to embodiments as disclosed herein.

FIG. 1 illustrates a high level overview of a communication system 100, according to embodiments as disclosed herein. As depicted in the FIG. 1, the communication system 100 includes a surface layer 102 and an underground layer 104. The surface layer 102 includes a network node 106 and a communication node 108. The underground layer 104 includes a plurality of communication nodes 108, 108a, 108b, 108c, 108d to 108n (herein after referred as 108-108n).

In an embodiment, the network node can be an element or a component that forms a part of a network. In an example, the network node is a base station.

In an embodiment, the communication node can be a component or an element that facilitates communication of data. Examples of communication nodes include sensors, routers, coordinators, transceivers, electronic devices, transceiver station and the like.

The communication node 108 can be buried under the surface layer 102 for facilitating the communication between the surface layer 102 and the underground layer 104 as shown in the FIG. 1.

Data communication is facilitated between the surface layer 102 and the underground layer 104 through the communication nodes (108-108n) and the network node 106.

In an embodiment, the data communicated between the surface layer 102 and the underground layer 104 can include voice, video and the like.

FIGS. 2A-2D illustrates the communication system 100 in which communication is facilitated between a surface layer and an underground layer, according to the embodiments as disclosed herein. As depicted in the FIG. 2A, the communication system 100 includes the surface layer 102 and the underground layer 104. The surface layer 102 includes a base station 106 and an unburied transceiver station 108. Inside the surface layer 102, a transceiver station is buried, which is referred as a buried transceiver station 108. The communication is facilitated between the surface layer 102 and the underground layer 104 through the buried transceiver station 108. The underground layer 104 includes a level 1 as shown in the FIG. 2A.

Figure 2A:
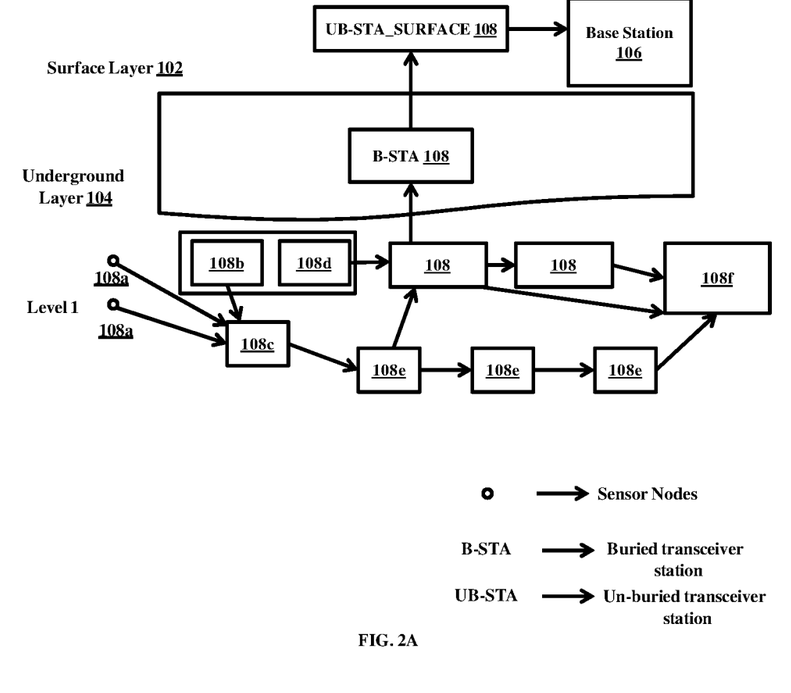
FIGS. 2A-2D illustrate the communication system in which communication is facilitated between a surface layer and an underground layer, according to the embodiments as disclosed herein.
Figure 2B:
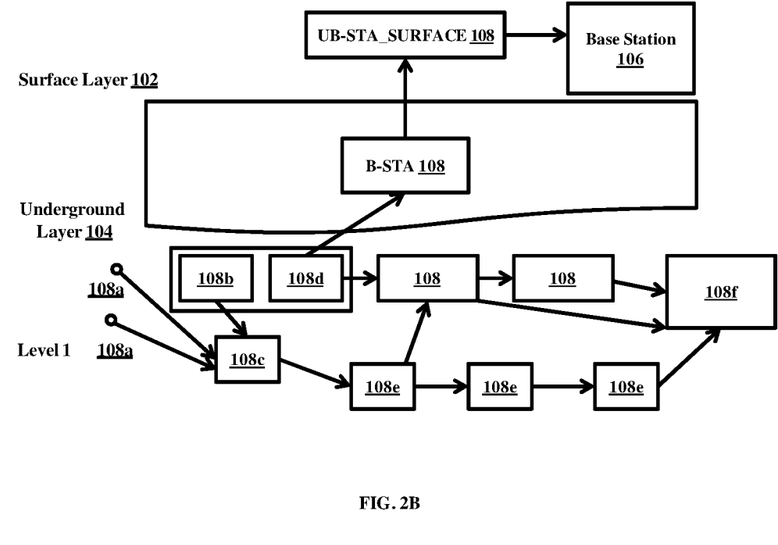

Further, the level 1 in the underground layer 104 includes a plurality of sensor nodes 108a, a transceiver 108b, a coordinator 108c, an electronic device with a meta-material antenna 108d, a plurality of unburied transceiver stations 108, a plurality of routers 108e and a sub-station 108f.

In an example, the sensor node 108a can be any type of sensor such as a smoke sensor, temperature sensor or the like for detecting an emergency situation in the underground layer 104 due to explosion or any emergency situation.

In another example, the sensor node 108a can be a pressure sensor to detect any breakage in the underground layer 104. In another example, the sensor node 108a can be an image sensor for monitoring video or audio data related to the work being carried out by persons in the underground layer 104. Further, it has to be understood that the above mentioned examples for the sensor nodes are not limited thereto.

In an example, the transceiver 108b is a ZigBee based radio-frequency identification (RFID) transceiver. The transceiver 108b can be carried by the person working in the underground layer 104.

In an example, the coordinator 108c is a ZigBee based coordinator. The coordinator 108c receives data from one or more sensor nodes 108a. Further, the coordinator sends the received data from the one or more sensor nodes 108a to one or more routers 108e.

The electronic device 108d includes a meta-material antenna. The electronic device 108d with the meta-material antenna is carried by the person working in the underground layer 104. In an example, the electronic device 108d can be a mobile phone or any other communication device.

The unburied transceiver station 108 facilitates communication between the electronic device 108d and the base station 106 in the surface layer 102.

The sub-station 108f receives data from one or more unburied transceiver stations 108 in the underground layer 104.

The sensor nodes 108a are placed in the underground layer as shown in the FIG. 2A. The sensor nodes 108a acquire data from the underground layer 104. The sensor nodes 108a send the acquired data to the coordinator 108c. Further, the coordinator sends the data to the sub-station 108f through one or more routers 108e as shown in the FIG. 2A.

In an embodiment, the router 108e sends the data received from the coordinator 108c to the unburied transceiver station 108. The unburied transceiver station 108 sends the data to the buried transceiver station 108 and then the data is sent to the base station 106 through the unburied transceiver station 108.

The communication from the underground layer 104 to the surface layer 102 can be facilitated as described herein.

In an embodiment, the electronic device with meta-material antenna 108d sends data to the unburied transceiver station 108. The unburied transceiver station 108 sends the data to the buried transceiver station 108. Further, the buried transceiver station 108 sends the data to the base station 106 in the surface layer 102 through unburied transceiver station 108 as shown in the FIG. 2A.

In an embodiment, the electronic device with meta-material antenna 108d sends data to the buried transceiver station 108. Further, the buried transceiver station 108 sends the data to the base station 106 in the surface layer 102 through unburied transceiver station 108 as shown in the FIG. 2B.

Figure 2C:
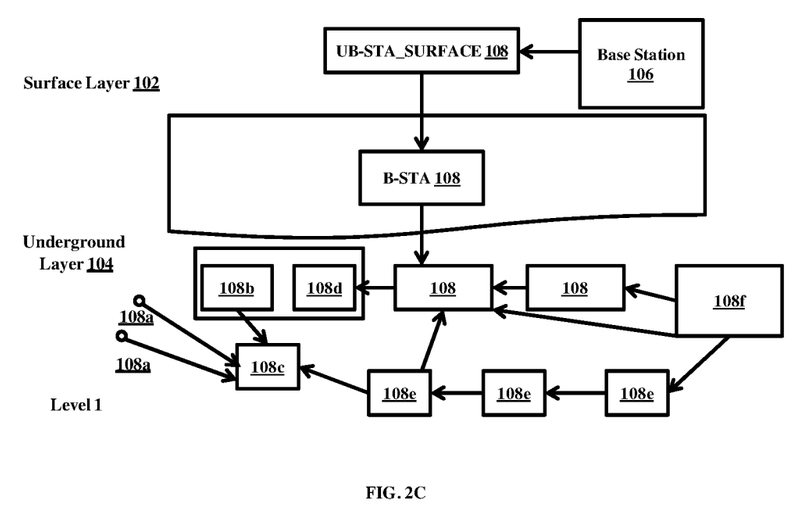
Figure 2D:
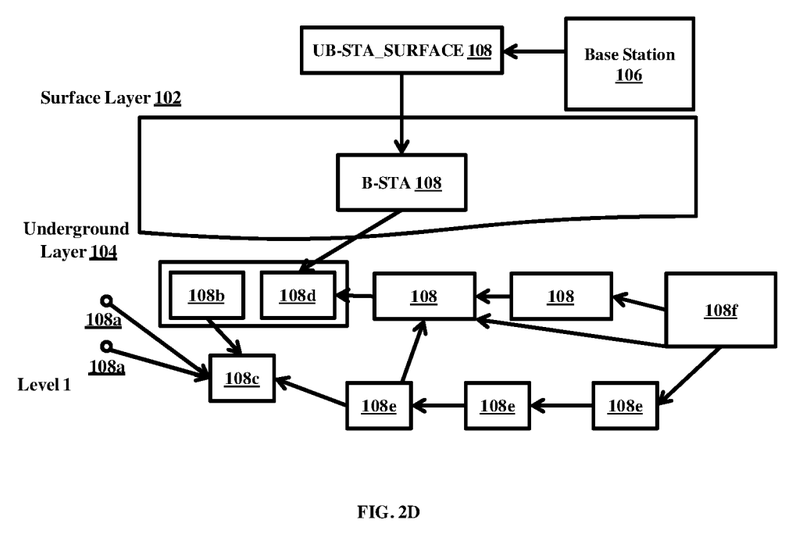

The communication from the surface layer 104 to the underground layer 102 can be facilitated as described herein.

In an embodiment, the base station 106 sends data to the buried transceiver station 108 through unburied transceiver station 108 present in the surface layer 102. The buried transceiver station 108 sends the data to the unburied transceiver station 108 in the underground layer 104. Further, the unburied transceiver station 108 sends the data to the electronic device 108d as shown in the FIG. 2C.

In an embodiment, the base station 106 sends data to the buried transceiver station 108 (through unburied transceiver station 108 present in surface layer 102). The buried transceiver station 108 sends the data to the electronic device 108d as shown in the FIG. 2D.

Figure 3A:
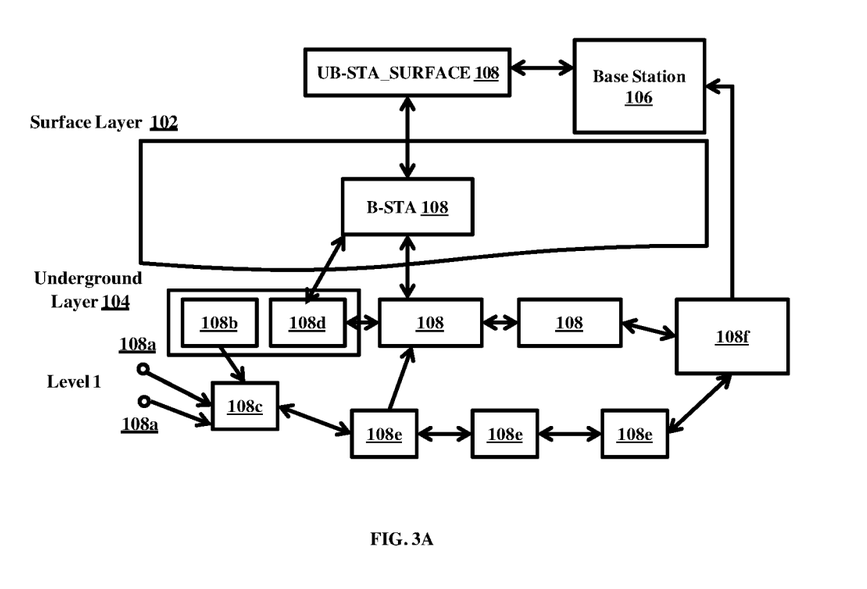
FIGS. 3A-3B illustrate the communication system in which communication is facilitated between a base station in the surface layer and a sub-station in the underground layer, according to the embodiments as disclosed herein.
Figure 3B:
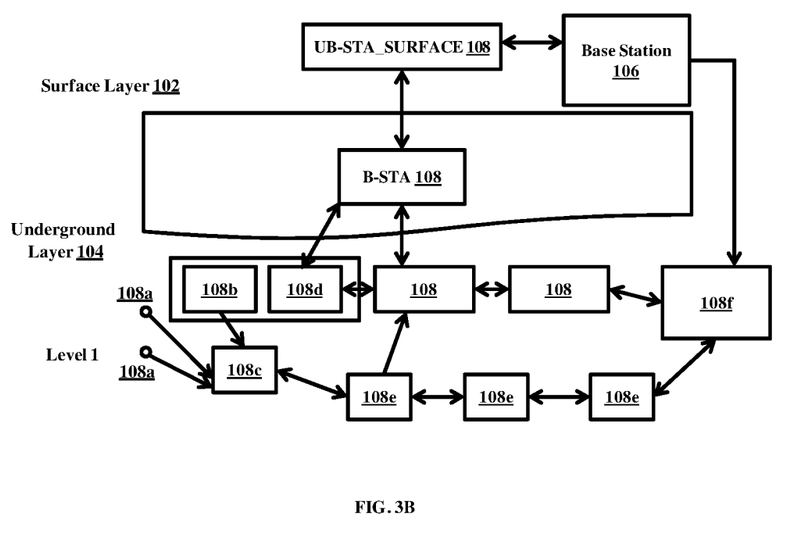

FIGS. 3A-3B illustrates the communication system in which communication is facilitated between a base station in the surface layer and a sub-station in the underground layer, according to the embodiments as disclosed herein.

In an embodiment, communication can be facilitated from the sub-station 108f in the underground layer 104 to the base station 106 in the surface layer 102.

A wired communication can be facilitated from the sub-station 108f in the underground layer 104 to the base station 106 in the surface layer 102 as shown in the FIG. 3A.

In an embodiment, communication can be facilitated from the base station 106 in the surface layer 102 to the sub-station 108f in the underground layer 104.

A wired communication can be facilitated from the base station 106 in the surface layer 102 to the sub-station 108f in the underground layer 104 as shown in the FIG. 3B.

Figure 4A:
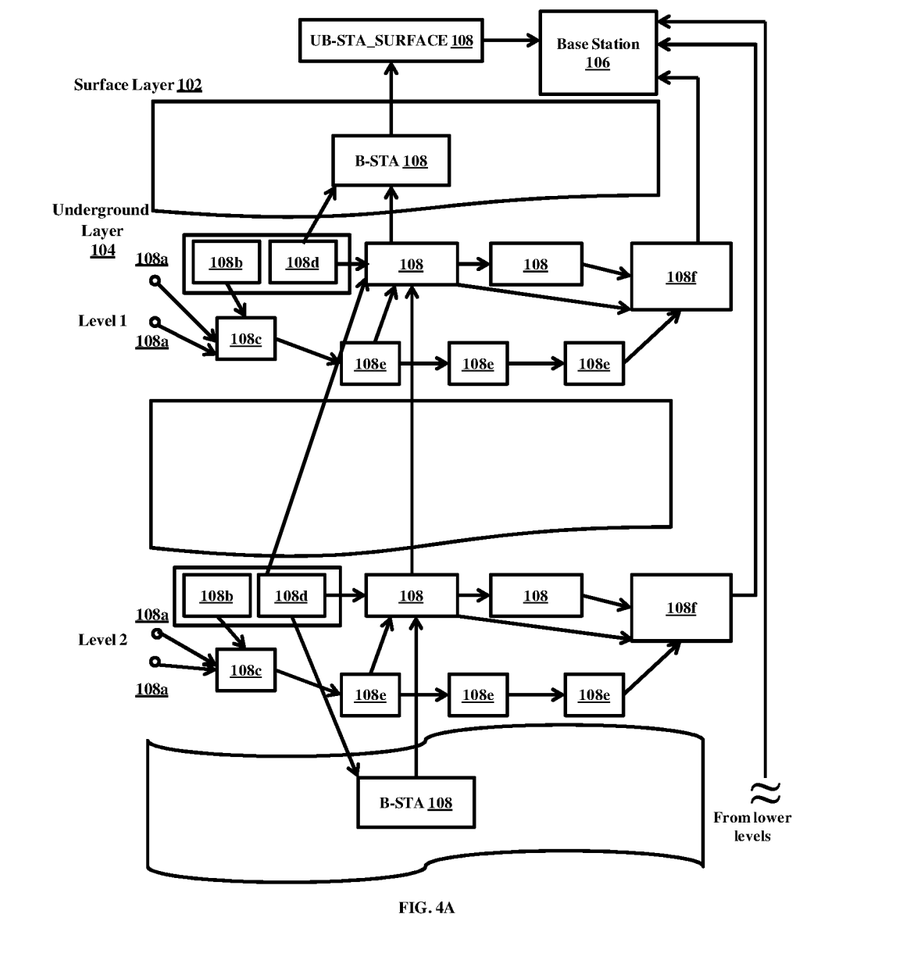
FIGS. 4A-4B illustrates an example communication system with multiple levels for underground communication, according to the embodiments as disclosed herein.
Figure 4B:
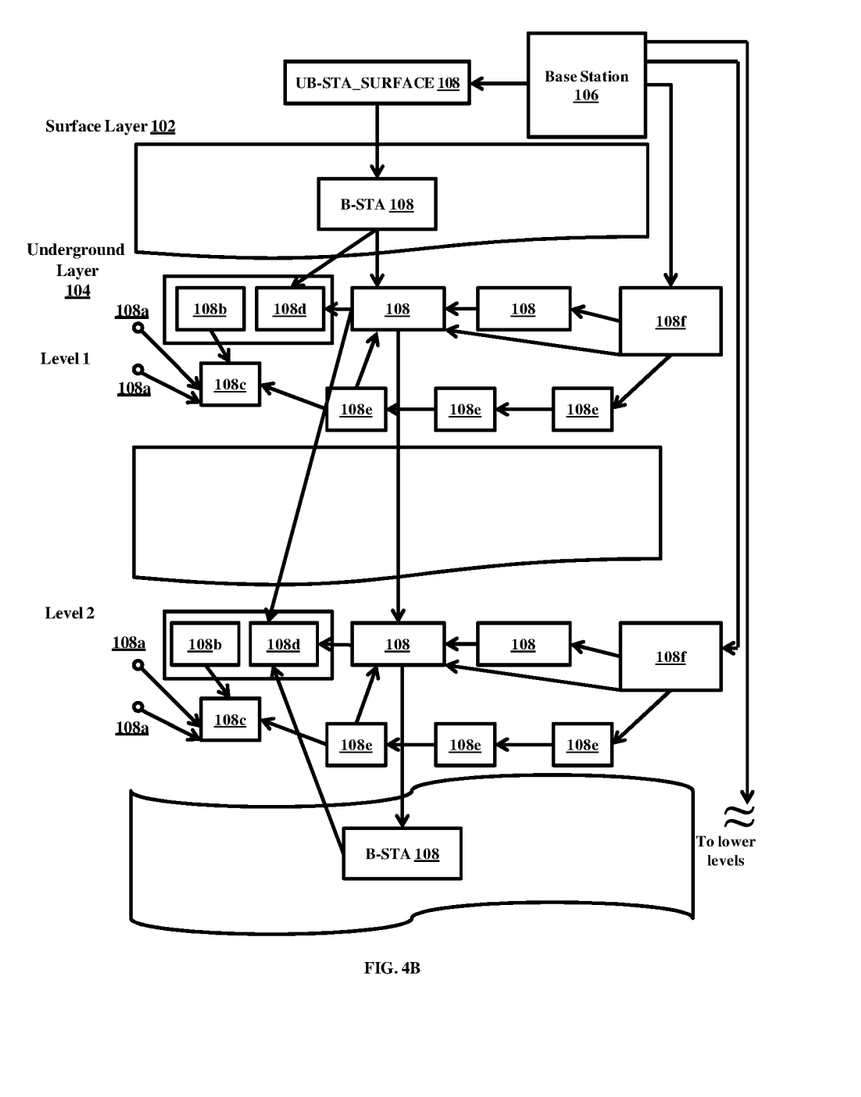

FIGS. 4A-4B illustrates an example system with multiple levels for underground communication, according to the embodiments as disclosed herein. The communication can be facilitated between the surface layer 102 and the underground layer 104 which includes multiple levels.

In the example shown in the FIGS. 4A-4B, the underground layer 104 includes two levels namely level 1 and level 2. Each level in the underground layer 104 includes the plurality of sensor nodes 108a, the transceiver 108b, the coordinator 108c, the electronic device with a meta-material antenna 108d, the plurality of unburied transceiver stations 108, the plurality of routers 108e and the sub-station 108f.

Communication can be facilitated between the level 1 and the level 2 in the underground layer 104.

In an embodiment, the unburied transceiver station 108 in the level 2 sends data received from the electronic device 108d in the level 2 to the unburied transceiver station 108 in the level 1.

In an embodiment, the unburied transceiver station 108 in the level 2 sends data received from the router 108e (through the coordinator 108c) in the level 2 to the unburied transceiver station 108 in the level 1.

In an embodiment, the electronic device 108d in the level 1 sends data to the unburied transceiver station 108 in the level 1.

The communication from the underground layer 104 to the surface layer 102 can be facilitated as described herein.

In an embodiment, the electronic device 108d sends data to the buried transceiver station 108 as shown in the FIG. 4A.

In an embodiment, the electronic device with meta-material antenna 108d sends data to the unburied transceiver station 108. The unburied transceiver station 108 sends the data to the buried transceiver station 108. Further, the buried transceiver station 108 sends the data to the base station 106 in the surface layer 102 through unburied transceiver station 108 as shown in the FIG. 4A.

In an embodiment, the electronic device 108 sends the data to the buried transceiver station 108 which is present beneath the level 2 as shown in the FIG. 4A.

In an embodiment, the unburied transceiver station 108 present in the level 2 sends data to the unburied transceiver station in level 1. Further, the unburied transceiver station 108 in the level 1 sends data to the buried transceiver station 108 beneath the surface layer 102. The buried transceiver station 108 sends data to the unburied transceiver station 108 in the surface layer 102 and then the unburied transceiver station 108 in the surface layer sends data to the base station 106. Thus, the data from the lower layers (level 2) reaches the upper layer (layer 1) and the data is sent to the base station 106 as shown in the FIG. 4A.

The communication from the surface layer 102 to the underground layer 104 can be facilitated as described herein.

In an embodiment, the base station 106 sends the data to the buried transceiver station 108. The buried transceiver station 108 sends the data to the electronic device 108d as shown in the FIG. 4B.

In an embodiment, the buried transceiver station 108 sends the data to the unburied transceiver station 108 in the level 1. Further, the unburied transceiver station 108 in the level 1 sends the data to the electronic device 108d.

In an embodiment, the unburied transceiver station 108 in the level 1 sends the data directly to the unburied transceiver station 108 in the level 2. Further, the unburied transceiver station 108 in the level 2 sends the data to the electronic device 108d in the level 2.

In an embodiment, the buried transceiver station 108 which is present beneath the level 2 sends the data to the electronic device 108d in the level 2 as shown in the FIG. 4B.

In an embodiment, the base station 106 sends the data to the buried transceiver station 108 in each level through the buried transceiver station 108 present in each level.

In order to send data to the lower levels, the base station 106 sends data to the buried transceiver station 108 in each level and the buried transceiver station 108 in each level sends the data to the buried transceiver station 108 to lower levels as shown in the FIG. 4B.

In an embodiment, the base station 106 sends data to the electronic device 108d present in each level.

The embodiments disclosed herein can be implemented through at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A communication system comprising:
 a surface layer including an unburied transceiver station connected to a base station; and
 an underground layer including:
  a buried transceiver station connected to said unburied transceiver station;
  an electronic device with a meta-material antenna and a transceiver in communication with said buried transceiver station;
  a coordinator in communication with a plurality of sensors nodes and a plurality of routers; and an unburied transceiver station in communication with said plurality of routers and meta-material antenna, wherein said unburied transceiver station in communication with said buried transceiver station;

wherein communication is facilitated between said underground layer and base station in said surface layer through one of: said meta-material antenna, and said unburied transceiver station, by said buried transceiver station.

2. The communication system of claim 1, wherein said coordinator receives data from said plurality of sensor nodes and sends said data to said base station through said plurality of routers, said unburied transceiver station, said buried transceiver station and unburied transceiver station in said surface layer.

3. The communication system of claim 1, wherein said communication from said base station to said underground layer is facilitated through said buried transceiver station and said meta-material antenna.

4. The communication system of claim 3, wherein said communication from said base station to said underground layer is facilitated through said buried transceiver station, said unburied transceiver station and said meta-material antenna.

5. The communication system of claim 1, wherein said communication from said underground layer to said base station is facilitated through said meta-material antenna and said unburied transceiver station.

6. The communication system of claim 5, wherein said communication from said underground layer to said base station is facilitated through said meta-material antenna and said buried transceiver station.

7. The communication system of claim 1, wherein said underground layer includes a plurality of levels with said plurality of sensors nodes, plurality of routers, plurality of unburied transceiver stations and said coordinator to facilitate communication between base station and said underground layer.

* * * * *